(12) United States Patent
Lippert

(10) Patent No.: US 9,285,014 B2
(45) Date of Patent: Mar. 15, 2016

(54) MULTI-SPEED TRANSMISSION

(71) Applicant: FORD GLOBAL TECHNOLOGIES, LLC, Dearborn, MI (US)

(72) Inventor: Robert Scott Lippert, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 222 days.

(21) Appl. No.: 14/067,517

(22) Filed: Oct. 30, 2013

(65) Prior Publication Data
US 2015/0119186 A1 Apr. 30, 2015

(51) Int. Cl.
*F16H 3/62* (2006.01)
*F16H 3/66* (2006.01)

(52) U.S. Cl.
CPC .. *F16H 3/62* (2013.01); *F16H 3/66* (2013.01); *F16H 2200/0056* (2013.01); *F16H 2200/0065* (2013.01); *F16H 2200/2012* (2013.01); *F16H 2200/2043* (2013.01); *F16H 2200/2046* (2013.01); *F16H 2200/2048* (2013.01); *F16H 2200/2066* (2013.01); *F16H 2200/2082* (2013.01); *F16H 2200/2097* (2013.01)

(58) Field of Classification Search
CPC ............................ F16H 2200/2082; F16H 3/62
See application file for complete search history.

(56) References Cited

U.S. PATENT DOCUMENTS

| | | | |
|---|---|---|---|
| 7,179,192 B2 * | 2/2007 | Park | 475/277 |
| 7,566,283 B2 | 7/2009 | Gumpoltsberger | |
| 7,695,395 B2 | 4/2010 | Carey et al. | |
| 7,946,948 B2 | 5/2011 | Phillips et al. | |
| 7,976,425 B2 * | 7/2011 | Wittkopp et al. | 475/284 |
| 8,047,947 B2 | 11/2011 | Phillips et al. | |
| 8,210,983 B2 | 7/2012 | Gumpoltsberger et al. | |
| 8,231,501 B2 | 7/2012 | Gumpoltsberger et al. | |
| 8,241,170 B2 | 8/2012 | Gumpoltsberger et al. | |
| 8,241,171 B2 | 8/2012 | Gumpoltsberger et al. | |
| 8,591,376 B1 * | 11/2013 | Shim et al. | 475/276 |
| 2008/0039266 A1 * | 2/2008 | Shim | F16H 3/66 475/280 |
| 2009/0280947 A1 * | 11/2009 | Seo et al. | 475/276 |
| 2011/0028262 A1 * | 2/2011 | Yamamoto et al. | 475/275 |
| 2012/0094799 A1 | 4/2012 | Phillips | |
| 2012/0115672 A1 | 5/2012 | Gumpoltsberger et al. | |
| 2012/0135835 A1 | 5/2012 | Gumpoltsberger et al. | |
| 2012/0142486 A1 | 6/2012 | Gumpoltsberger et al. | |
| 2012/0149526 A1 | 6/2012 | Gumpoltsberger et al. | |
| 2012/0270694 A1 * | 10/2012 | Seo et al. | 475/276 |
| 2013/0040776 A1 | 2/2013 | Mellet et al. | |
| 2014/0256499 A1 * | 9/2014 | Lippert et al. | 475/275 |
| 2014/0296022 A1 * | 10/2014 | Janson et al. | 475/282 |
| 2015/0119185 A1 * | 4/2015 | Lippert | F16H 3/62 475/275 |

OTHER PUBLICATIONS

H. Benford, M. Leising, The Lever Analogy: A New Tool in Transmission Analysis, 1982, Society of Automotive Engineers, Inc. 810102, p. 429-437.

* cited by examiner

*Primary Examiner* — Ramya Burgess
*Assistant Examiner* — Lillian Nguyen
(74) *Attorney, Agent, or Firm* — James Dottavio; Brooks Kushman P.C.

(57) ABSTRACT

A transmission gearing arrangement has four simple planetary gear sets and five or six shift elements. A ring gear is fixedly held against rotation. A sun gear and a carrier are fixedly coupled to the input shaft. One embodiment has two brakes and three clutches and produces seven forward speeds by selective engagement of various combinations of two of the shift elements. Other embodiments have two brakes and four clutches and produce nine forward speeds by selective engagement of various combinations of two of the shift elements. Each embodiment may optionally include a passive one way brake that simplifies the control of certain shifts.

22 Claims, 3 Drawing Sheets

MULTI-SPEED TRANSMISSION

TECHNICAL FIELD

This disclosure relates to the field of automatic transmissions for motor vehicles. More particularly, the disclosure pertains to an arrangement of gears, clutches, and the interconnections among them in a power transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

SUMMARY OF THE DISCLOSURE

Figure 1:
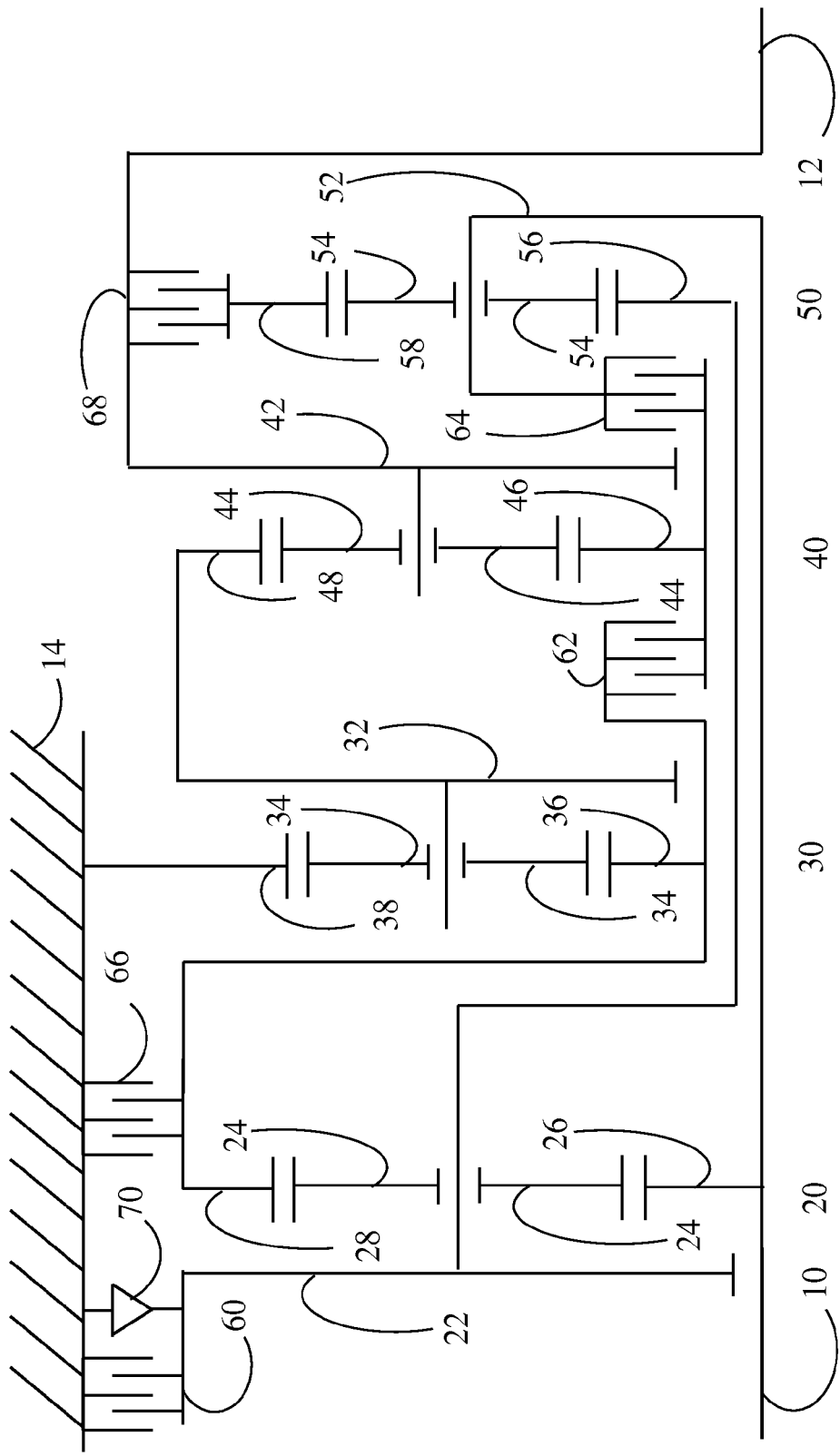
FIG. 1 is a schematic diagram of a first transmission gearing arrangement.

In a transmission, four gearing arrangements impose specified speed relationships among an input, an output, and first through fourth shafts. A first gearing arrangement fixedly imposes a linear speed relationship among the input, the first shaft, and the second shaft. The first gearing arrangement may be, for example, a simple planetary gear set having a sun gear fixedly coupled to the input, a ring gear fixedly coupled to the second shaft, and a carrier fixedly coupled to the first shaft. A second gearing arrangement fixedly imposes a proportional speed relationship between the second shaft and the third shaft. The second gearing arrangement may be, for example, a simple planetary gear set having a sun gear fixedly coupled to the second shaft, a ring gear fixedly held against rotation, and a carrier fixedly coupled to the third shaft. A third gearing arrangement fixedly imposes a linear speed relationship among the third shaft, the output, and the fourth shaft. The third gearing arrangement may be, for example, a simple planetary gear set having a sun gear fixedly coupled to the fourth, a ring gear fixedly coupled to the third shaft, and a carrier fixedly coupled to the output. Finally, a fourth gearing arrangement selectively imposes a linear speed relationship among the first shaft, the input, and the output. The fourth gearing arrangement may be, for example, a simple planetary gear set having a sun gear fixedly coupled to the first shaft, a ring gear selectively coupled to the output by a clutch, and a carrier fixedly coupled to the input. As another example, the fourth gearing arrangement may be a simple planetary gear set having a sun gear selectively coupled to the first shaft by a clutch, a ring gear fixedly coupled to the output, and a carrier fixedly coupled to the input. The transmission may further include brakes selectively holding the first shaft and the second shaft, respectively, against rotation. Clutches may selectively couple the fourth shaft to the first shaft and the input, respectively.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A group of rotating elements are fixedly coupled to one another if they are constrained to rotate as a unit in all operating conditions. Rotating elements can be fixedly coupled by spline connections, welding, press fitting, machining from a common solid, or other means. Slight variations in rotational displacement between fixedly coupled elements can occur such as displacement due to lash or shaft compliance. One or more rotating elements that are all fixedly coupled to one another may be called a shaft. In contrast, two rotating elements are selectively coupled by a shift element when the shift element constrains them to rotate as a unit whenever it is fully engaged and they are free to rotate at distinct speeds in at least some other operating condition. A shift element that holds a rotating element against rotation by selectively connecting it to the housing is called a brake. A shift element that selectively couples two or more rotating elements to one another is called a clutch. Shift elements may be actively controlled devices such as hydraulically or electrically actuated clutches or brakes or may be passive devices such as one way clutches or brakes. Shift elements may be positive engagement devices such as dog clutches or friction devices capable of transmitting torque between elements in the presence of relative rotation. Two rotating elements are coupled if they are either fixedly coupled or selectively coupled.

A gearing arrangement is a collection of gearing elements and shift elements configured to impose specified speed relationships among a set of shafts. Some speed relationships, called fixed speed relationships, are imposed regardless of the state of any shift elements. Other speed relationships, called selective speed relationships, are imposed only when particular shift elements are fully engaged. The speed of a shaft is positive when the shaft rotates in one direction and negative when the shaft rotates in the opposite direction. A proportional speed relationship exists between a first shaft and a second shaft when the ratio of their speeds is constrained to be a predetermined value. A proportional speed relationship between a first shaft and a second shaft is an underdrive relationship if the ratio of the second shaft speed to the first shaft speed is between zero and one. Similarly, a proportional speed relationship between a first shaft and a second shaft is an overdrive relationship if the ratio of the second shaft speed to the first shaft speed is greater than one. A linear speed relationship exists among an ordered list of shafts when i) the first and last shaft in the ordered list are constrained to have the most extreme speeds, ii) the speeds of the remaining shafts are each constrained to be a weighted average of the speeds of the first and last shafts, and iii) when the speeds of the shafts differ, they are constrained to be in the listed order, either increasing or decreasing.

FIG. 1 depicts a transmission that provides seven forward and one reverse speed ratios between input 10 and output 12. Input 10 may be driven by an internal combustion engine or other prime mover. A launch device such as a torque converter or launch clutch may be employed between the prime mover and input 10 permitting the engine to idle while the vehicle is stationary and a transmission ratio is selected. Output 12 drives the vehicle wheels, preferably via a differential that allows a slight speed difference between left and right wheels while the vehicle goes around a corner.

The transmission of FIG. 1 utilizes four simple planetary gear sets 20, 30, 40, and 50. A planet carrier 22 rotates about a central axis and supports a set of planet gears 24 such that the planet gears rotate with respect to the planet carrier. External gear teeth on the planet gears mesh with external gear teeth on a sun gear 26 and with internal gear teeth on a ring gear 28. The sun gear and ring gear are supported to rotate about the same axis as the carrier. Gear sets 30, 40, and 50 are similarly structured. A suggested ratio of gear teeth for each planetary gear set is listed in Table 1.

TABLE 1

| | |
|---|---|
| Ring 28/Sun 26 | 1.500 |
| Ring 38/Sun 36 | 1.800 |
| Ring 48/Sun 46 | 1.500 |
| Ring 58/Sun 56 | 3.000 |

A simple planetary gear set is a type of gearing arrangement that imposes a fixed linear speed relationship among the sun gear, the planet carrier, and the ring gear. Other known types of gearing arrangements also impose a fixed linear speed relationship among three rotating elements. For example, a double pinion planetary gear set imposes a fixed linear speed relationship among the sun gear, the ring gear, and the planet carrier.

Sun gear 26 and carrier 52 are fixedly coupled to input 10. Carrier 42 is fixedly coupled to output 12. Ring gear 38 is fixedly held against rotation. Carrier 22 is fixedly coupled to sun gear 56 forming a first shaft. Ring gear 28 and sun gear 36 are fixedly coupled forming a second shaft. Carrier 32 is fixedly coupled to ring 48 forming a third shaft. Sun gear 46 forms a fourth shaft. Brake 60 selectively couples the first shaft to housing 14 to selectively hold the first shaft against rotation. The fourth shaft is selectively coupled to the second shaft by clutch 62 and selectively coupled to input 10 by clutch 64. The second shaft is selectively held against rotation by brake 66. Ring gear 58 is selectively coupled to output 12 by clutch 68. Optional one-way-brake 70 passively holds the first shaft against rotation in a reverse direction, opposite the normal rotation of input shaft 10, while permitting rotation in a positive direction.

Various subsets of the gearing arrangement of FIG. 1 impose particular speed relationships. Gear set 30 fixedly imposes an underdrive relationship between carrier 32 and sun gear 36. Gear set 30 and brake 66 collectively selectively hold both the second and the third shafts against rotation. The same effect could be accomplished if brake 66 selectively directly held the third shaft against rotation or if it selectively coupled the second shaft to the third shaft. Gear set 50 and clutch 68 selectively impose a linear speed relationship among the first shaft, input 10, and output 12.

As shown in Table 2, engaging the shift elements in combinations of two establishes seven forward speed ratios and one reverse speed ratio between input 10 and output 12. An X indicates that the shift element is required to establish the power transfer path. If optional one-way-brake 70 is present, it will engage in 1st gear, making engagement of brake 60 unnecessary to transfer power from the input to the output. However, brake 60 must be engaged to transfer power from the output to the input in 1st gear. When the gear sets have tooth numbers as indicated in Table 1, the speed ratios have the values indicated in Table 2.

TABLE 2

| | 60/70 | 62 | 64 | 66 | 68 | Ratio | Step |
|---|---|---|---|---|---|---|---|
| Rev | X | X | | | | −2.44 | 63% |
| 1$^{st}$ | X | | X | | | 3.89 | |
| 2$^{nd}$ | | | X | X | | 2.50 | 1.56 |
| 3$^{rd}$ | | X | X | | | 1.63 | 1.54 |
| 4$^{th}$ | | | X | | X | 1.23 | 1.33 |
| 5$^{th}$ | | X | | | X | 1.11 | 1.11 |
| 6$^{th}$ | | | | X | X | 0.83 | 1.33 |
| 7$^{th}$ | X | | | | X | 0.75 | 1.11 |

In operation, brakes 60 may be engaged while the vehicle is in park. If the driver then selects reverse, clutch 62 is engaged. If the driver shifts from park to drive, clutch 64 is engaged. If optional one-way-brake 70 is present, clutch 60 may be released in drive. All single and two step shifts are accomplished by gradually releasing one shift element while gradually engaging another shift element. If one-way-brake 70 is present, then it will release passively during any upshift from 1st gear.

Figure 2:
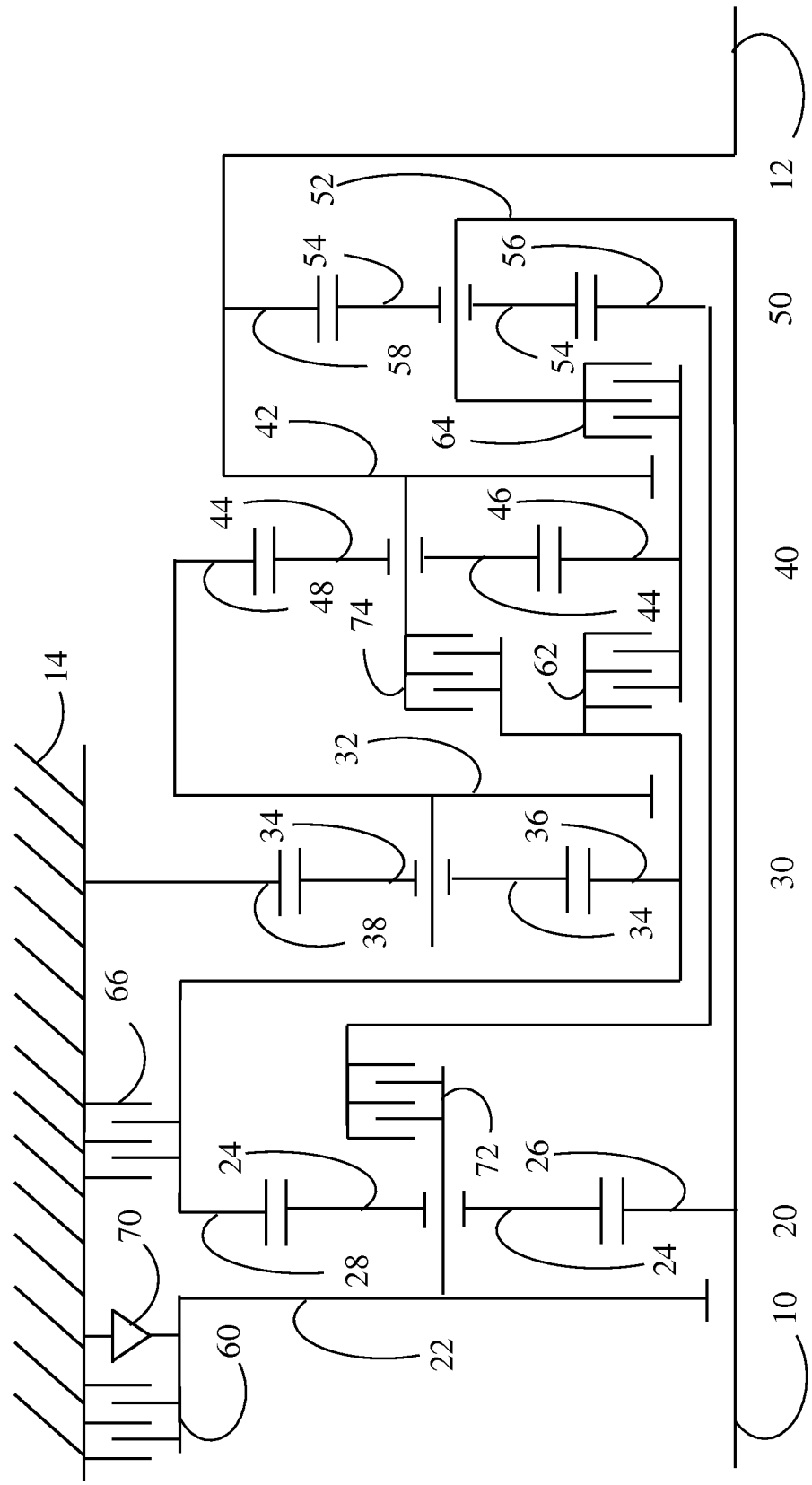
FIG. 2 is a schematic diagram of a second transmission gearing arrangement.

FIG. 2 depicts a transmission that provides nine forward and one reverse speed ratios between input 10 and output 12. The transmission of FIG. 2 utilizes four simple planetary gear sets 20, 30, 40, and 50. A suggested ratio of gear teeth for each planetary gear set is listed in Table 3.

TABLE 3

| | |
|---|---|
| Ring 28/Sun 26 | 2.715 |
| Ring 38/Sun 36 | 1.741 |
| Ring 48/Sun 46 | 2.430 |
| Ring 58/Sun 56 | 2.785 |

Sun gear 26 and carrier 52 are fixedly coupled to input 10. Carrier 42 and ring gear 58 are fixedly coupled to output 12. Ring gear 38 is fixedly held against rotation. Carrier 22 forms a first shaft. Ring gear 28 and sun gear 36 are fixedly coupled forming a second shaft. Carrier 32 is fixedly coupled to ring 48 forming a third shaft. Sun gear 46 forms a fourth shaft. The first shaft is selectively held against rotation by brake 60 and selectively coupled to the sun gear 56 by clutch 72. The fourth shaft is selectively coupled to the second shaft by clutch 62 and selectively coupled to input 10 by clutch 64. The second shaft is selectively held against rotation by brake 66 and selectively coupled to output 12 by clutch 74. Optional one-way-brake 70 passively holds the first shaft against rotation in a reverse direction while permitting rotation in a positive direction.

Various subsets of the gearing arrangement of FIG. 2 impose particular speed relationships. Gear set 30 fixedly imposes an underdrive relationship between carrier 32 and sun gear 36. Gear set 30 and brake 66 collectively selectively hold both the second and the third shafts against rotation. Gear set 50 and clutch 72 selectively impose a linear speed relationship among the first shaft, input 10, and output 12.

As shown in Table 4, engaging the shift elements in combinations of two establishes nine forward speed ratios and one reverse speed ratio between input 10 and output 12. When the gear sets have tooth numbers as indicated in Table 3, the speed ratios have the values indicated in Table 4. Operation of the transmission of FIG. 2 is analogous to the transmission of FIG. 1 as described above.

TABLE 4

|  | 60/70 | 62 | 64 | 66 | 72 | 74 | Ratio | Step |
|---|---|---|---|---|---|---|---|---|
| Rev | X | X |  |  |  |  | −4.94 | 97% |
| 1st | X |  | X |  |  |  | 5.09 |  |
| 2nd |  |  | X | X |  |  | 3.43 | 1.49 |
| 3rd |  |  | X |  |  | X | 2.54 | 1.35 |
| 4th |  | X | X |  |  |  | 1.82 | 1.40 |
| 5th |  |  | X |  | X |  | 1.29 | 1.41 |
| 6th |  | X |  |  | X |  | 1.17 | 1.11 |
| 7th |  |  |  |  | X | X | 1.00 | 1.17 |
| 8th |  |  |  | X | X |  | 0.79 | 1.26 |
| 9th | X |  |  |  | X |  | 0.74 | 1.08 |

Figure 3:
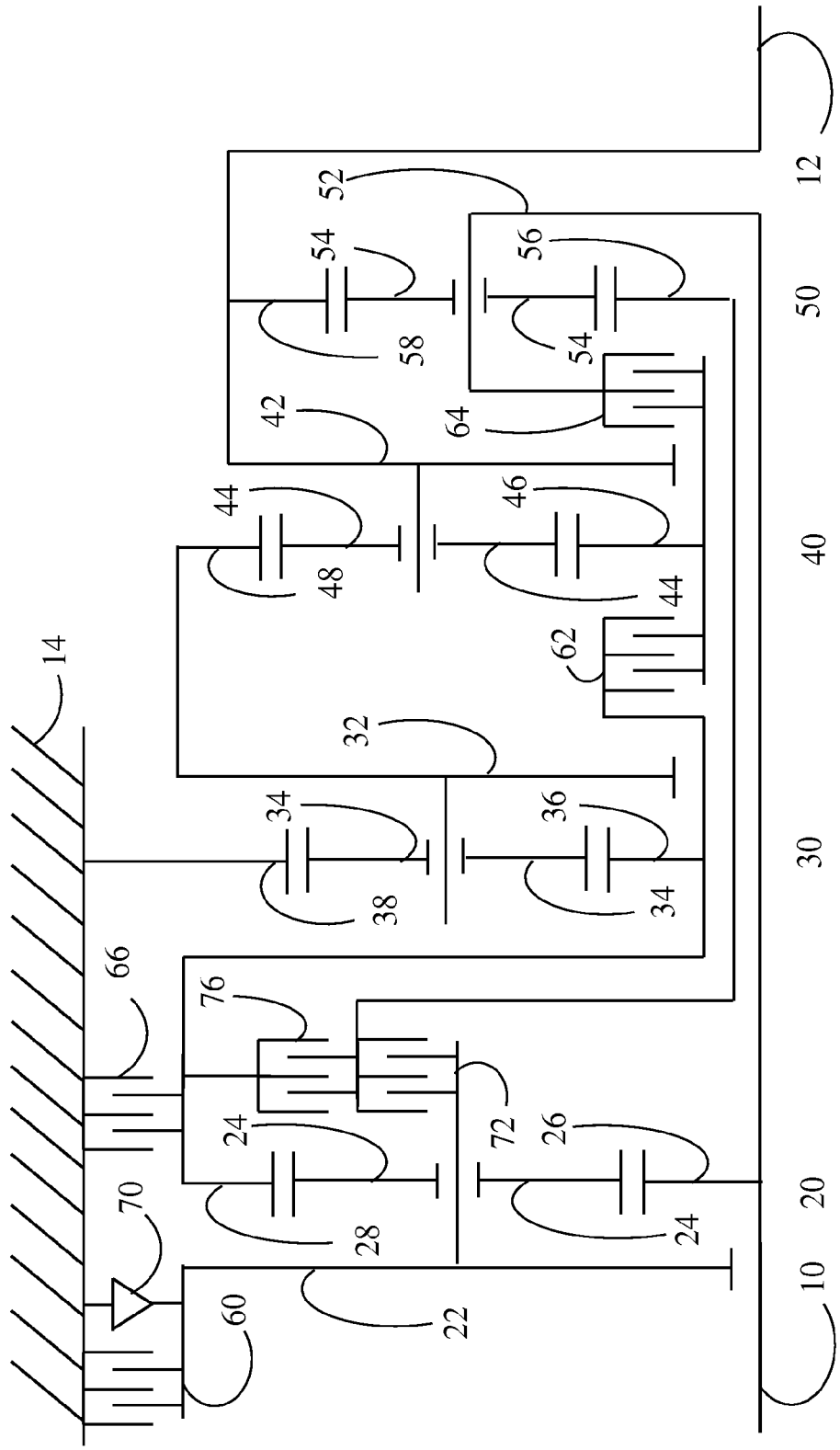
FIG. 3 is a schematic diagram of a third transmission gearing arrangement.

FIG. 3 depicts a transmission that provides nine forward and one reverse speed ratios between input 10 and output 12. The transmission of FIG. 3 utilizes four simple planetary gear sets 20, 30, 40, and 50. A suggested ratio of gear teeth for each planetary gear set is listed in Table 5.

TABLE 5

| Ring 28/Sun 26 | 1.675 |
|---|---|
| Ring 38/Sun 36 | 3.775 |
| Ring 48/Sun 46 | 2.451 |
| Ring 58/Sun 56 | 2.415 |

Sun gear 26 and carrier 52 are fixedly coupled to input 10. Carrier 42 and ring gear 58 are fixedly coupled to output 12. Ring gear 38 is fixedly held against rotation. Carrier 22 forms a first shaft. Ring gear 28 and sun gear 36 are fixedly coupled forming a second shaft. Carrier 32 is fixedly coupled to ring 48 forming a third shaft. Sun gear 46 forms a fourth shaft. The first shaft is selectively held against rotation by brake 60 and selectively coupled to the sun gear 56 by clutch 72. The fourth shaft is selectively coupled to the second shaft by clutch 62 and selectively coupled to input 10 by clutch 64. The second shaft is selectively held against rotation by brake 66 and selectively coupled to sun gear 56 by clutch 76. Optional one-way-brake 70 passively holds the first shaft against rotation in a reverse direction while permitting rotation in a positive direction.

As shown in Table 6, engaging the shift elements in combinations of two establishes nine forward speed ratios and one reverse speed ratio between input 10 and output 12. When the gear sets have tooth numbers as indicated in Table 5, the speed ratios have the values indicated in Table 6. Operation of the transmission of FIG. 3 is analogous to the transmission of FIG. 1 as described above.

TABLE 6

|  | 60/70 | 62 | 64 | 66 | 72 | 76 | Ratio | Step |
|---|---|---|---|---|---|---|---|---|
| Rev | X | X |  |  |  |  | −3.82 | 77% |
| 1st | X |  | X |  |  |  | 4.98 |  |
| 2nd |  |  | X | X |  |  | 3.45 | 1.44 |
| 3rd |  | X | X |  |  |  | 2.28 | 1.51 |
| 4th |  |  | X |  |  | X | 1.70 | 1.34 |
| 5th |  | X |  |  |  | X | 1.38 | 1.24 |
| 6th |  | X |  |  | X |  | 1.26 | 1.09 |
| 7th |  |  |  |  | X | X | 1.00 | 1.26 |
| 8th |  |  |  | X | X |  | 0.79 | 1.26 |
| 9th | X |  |  |  | X |  | 0.71 | 1.12 |

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A transmission comprising:
   an input;
   an output;
   first, second, third, and fourth shafts;
   a first gearing arrangement configured to fixedly impose a linear speed relationship among the input, the first shaft, and the second shaft;
   a second gearing arrangement configured to fixedly impose a proportional speed relationship between the second shaft and the third shaft;
   a third gearing arrangement configured to fixedly impose a linear speed relationship among the third shaft, the output, and the fourth shaft; and
   a fourth gearing arrangement configured to selectively impose a linear speed relationship among the first shaft, the input, and the output.

2. The transmission of claim 1 further comprising a first brake configured to selectively hold the first shaft against rotation.

3. The transmission of claim 2 further comprising a one-way-brake configured to passively hold the first shaft against rotation in a reverse direction while permitting rotation in a forward direction.

4. The transmission of claim 1 further comprising a first clutch configured to selectively couple the second shaft to the fourth shaft.

5. The transmission of claim 1 further comprising a second clutch configured to selectively couple the input to the fourth shaft.

6. The transmission of claim 1 further comprising a second brake configured to operatively selectively hold the second shaft against rotation.

7. The transmission of claim 6 wherein the second brake directly selectively couples the second shaft to a transmission housing.

8. The transmission of claim 1 further comprising a fourth clutch configured to selectively couple the output to the second shaft.

9. The transmission of claim 1 wherein the first gearing arrangement comprises a simple planetary gear set having a sun gear fixedly coupled to the input, a ring gear fixedly coupled to the second shaft, and a planet carrier fixedly coupled to the first shaft.

10. The transmission of claim 1 wherein the second gearing arrangement is configured to fixedly impose an underdrive relationship between the second shaft and the third shaft.

11. The transmission of claim 1 wherein the second gearing arrangement comprises a simple planetary gear set having a sun gear fixedly coupled to the second shaft, a ring gear fixedly coupled to a transmission housing, and a planet carrier fixedly coupled to the third shaft.

12. The transmission of claim 1 wherein the third gearing arrangement comprises a simple planetary gear set having a sun gear fixedly coupled to the fourth shaft, a ring gear fixedly coupled to the third shaft, and a planet carrier fixedly coupled to the output.

13. The transmission of claim 1 wherein the fourth gearing arrangement comprises:
   a simple planetary gear set having a sun gear fixedly coupled to the first shaft, a ring gear, and a planet carrier fixedly coupled to the input; and
   a third clutch configured to selectively couple the ring gear to the output.

14. The transmission of claim 1 wherein the fourth gearing arrangement comprises:
   a simple planetary gear set having a sun gear, a ring gear fixedly coupled to the output, and a planet carrier fixedly coupled to the input; and
   a third clutch configured to selectively couple the sun gear to the first shaft.

15. The transmission of claim 14 further comprising a fourth clutch configured to selectively couple the sun gear to the second shaft.

16. A transmission comprising:
   a first gearset imposing a fixed linear speed relationship among an input, a first shaft, and a second shaft;
   a second gearset imposing an underdrive relationship between the second shaft and a third shaft;
   a third gearset imposing a fixed linear speed relationship among the third shaft, an output, and a fourth shaft; and
   a gearset imposing a selective linear speed relationship among the first shaft, the input, and the output.

17. The transmission of claim 16 wherein the second gearset fixedly imposes the underdrive relationship between the second shaft and the third shaft.

18. The transmission of claim 16 further comprising:
   a first brake configured to selectively hold the first shaft against rotation;
   a second brake configured to selectively hold the second shaft against rotation;
   a first clutch configured to selectively couple the second shaft to the fourth shaft; and
   a second clutch configured to selectively couple the input to the fourth shaft.

19. The transmission of claim 18 further comprising a one-way-brake configured to passively hold the first shaft against rotation in a reverse direction while permitting rotation in a forward direction.

20. The transmission of claim 18 wherein the fourth gearset comprises:
   a simple planetary gear set having a sun gear, a ring gear fixedly coupled to the output, and a planet carrier fixedly coupled to the input; and
   a third clutch configured to selectively couple the sun gear to the first shaft.

21. The transmission of claim 20 further comprising a fourth clutch configured to selectively couple the sun gear to the second shaft.

22. The transmission of claim 18 further comprising a fifth clutch configured to selectively couple the output to the second shaft.

* * * * *